Patented Feb. 1, 1938

2,107,203

UNITED STATES PATENT OFFICE 2,107,203

APPLICATION OF A PLASTICIZING AGENT FOR CELLULOSE DERIVATIVES

Ritchie Hart Lock, Chigwell, England

No Drawing. Original application December 10, 1936, Serial No. 115,269. Divided and this application June 21, 1937, Serial No. 149,547. In Great Britain December 17, 1935

6 Claims. (Cl. 106—37)

This invention relates to a manufacture of lacquers, films, plastic masses and other artificial products from cellulose derivatives, in which the cellulose derivative is plasticized by incorporating with it the triacetate of glycerol monolactate.

I have found that this substance, which has not hitherto been described, has properties which render it a valuable plasticizing agent for cellulose derivatives, such as cellulose nitrate and, more particularly, cellulose acetate. It may be incorporated in relatively large quantity without adverse influence on the products; for example, in the manufacture of films from cellulose acetate the quantity of the new plasticizing agent may be as high as 150 per cent. of the weight of the cellulose ester.

The new plasticizing agent has a low volatility; in this respect it compares very favourably with triacetin, which is one of the plasticizing agents most used for cellulose acetate.

Products prepared from cellulose derivatives with the aid of the new plasticizing agent have a low inflammability.

The procedure for making lacquers, films and other artificial products with the aid of the new plasticizing agent may follow that hitherto usual for making such products.

The following particular applications of glycerol monolactate triactate may be mentioned:

(a) In lacquers and coating compositions having a cellulose acetate or nitrocellulose base, with or without a natural or artificial resin. The quantity of glycerol monolactate triacetate may suitably be about 25–100 per cent. of the weight of the cellulose ester, or even higher (up to 150 per cent.), more particularly in the case of compositions for producing insulating coatings on electrical conductors.

(b) In cellulose acetate moulding powders for moulding under heat and pressure or by extrusion; a suitable quantity of glycerol monolactate triacetate is about 40 per cent. of the weight of the cellulose acetate.

(c) In plastic compositions or solutions of cellulose acetate or triacetate or introcellulose suitable for working up into sheets, films or rods.

(d) In the manufacture of laminated glass having an intermediate sheet of cellulose acetate or triacetate or nitrocellulose. The glycerol monolactate triacetate may be incorporated in the composition or solution from which the intermediate sheet is to be formed, according to (c). Or an intermediate sheet of one of the said cellulose derivatives may be treated in a bath consisting of a solution of glycerol monolactate triacetate in order to render it adhesive. Glycerol monolactate triacetate is also useful as an ingredient in adhesive preparations containing cellulose acetate or nitrocellulose, a synthetic resin and a solvent (such as acetone), for use in the production of laminated glass.

(e) In solutions of cellulose acetate or triacetate for spinning artificial fibres by wet or dry spinning processes.

In all cases, glycerol monolactate triacetate may be used as the sole plasticizing agent or it may be used in conjunction with other plasticizers.

The triacetate of glycerol monolactate is a slightly viscous liquid having a specific gravity of approximately 1.185. It is soluble to the extent of about 5 per cent. in water and completely miscible with benzene. It is stable up to 200° C. but decomposes above this temperature. It is prepared by causing an acetylating agent to act on glycerol monolactate in proportion sufficient for the production of a triester. As the acetylating agent there may be used acetic anhydride or acetic acid, which may be concentrated or even moderately dilute, for example, of about 90 per cent. strength.

The procedure may consist in heating glycerol monolactate with acetic acid or acetic anhydride in presence of an acetylation catalyst, for instance, at the temperature corresponding with the boiling point of the mixture. When acetic acid is used, it is advantageous to add an organic solvent, such as benzene, whose vapours can entrain water formed in the reaction.

The glycerol monolactate used as parent material can be obtained by the process forming the subject of British Specification No. 456,525.

It is not necessary to isolate the glycerol monolactate obtained by that process, but the crude reaction product containing any solvent or catalyst used in the process may with advantage be acetylated directly in accordance with the present invention.

The manufacture of glycerol monolactate triacetate in accordance with the invention is illustrated by the following examples:

Example 1.—164 lbs. of glycerol monolactate (as obtained by the process of specification No. 456,525), 200 lbs. of glacial acetic acid, 0.25 lb. of sulphuric acid and 10 gallons of benzene are heated together in a still, the vapours which distill are condensed and the benzene layer of the condensate is separated from the aqueous layer and returned to the still. The process is continued until about 54 pounds of water have thus been separated. The contents of the still are then washed with water or a dilute alkali solution and the benzene is expelled by distillation, finally under reduced pressure. The product so obtained may be decolorized by known methods.

Example 2.—A mixture of 164 lbs. of glycerol monolactate, 204 lbs. of acetic anhydride and 0.25 lb. of sulphuric acid is cautiously heated in a reflux apparatus; when the reaction has moderated further 102 lbs. of acetic anhydride are added, whilst the reaction mixture is gently boiled. When the reaction is nearly complete, the reaction mixture is cooled and the acetic acid is removed by washing with water or a dilute alkali solution or in some other simple manner. If unchanged acetic anhydride is present, it can be decomposed by warm water. The final product is finally freed from water under reduced presure and decolorized.

The manufacture herein referred to of glycerol monolactate triacetate forms the subject of U. S. application Serial No. 115,269 filed December 10th, 1936, of which this application is a division.

I claim:
1. A new composition of matter and shaped products manufactured therefrom containing a cellulose derivative and glycerol monolactate triacetate as a plasticizer therefor.

2. A coating composition comprising a cellulose derivative, glycerol monolactate triacetate as a plasticizer therefor and a solvent.

3. A new composition of matter and shaped products manufactured therefrom containing a cellulose acetate and glycerol monolactate triacetate as a plasticizer therefor.

4. A coating composition comprising a cellulose acetate, glycerol monolactate triacetate as a plasticizer therefor and a solvent.

5. A new composition of matter and shaped products manufactured therefrom containing nitrocellulose and glycerol monolactate triacetate as a plasticizer therefor.

6. A coating composition comprising nitrocellulose, glycerol monolactate triacetate as a plasticizer therefor and a solvent.

RITCHIE HART LOCK.